O. M. MITCHELL.
Culinary Vessel.
No. 92,867.
Patented July 20, 1869.
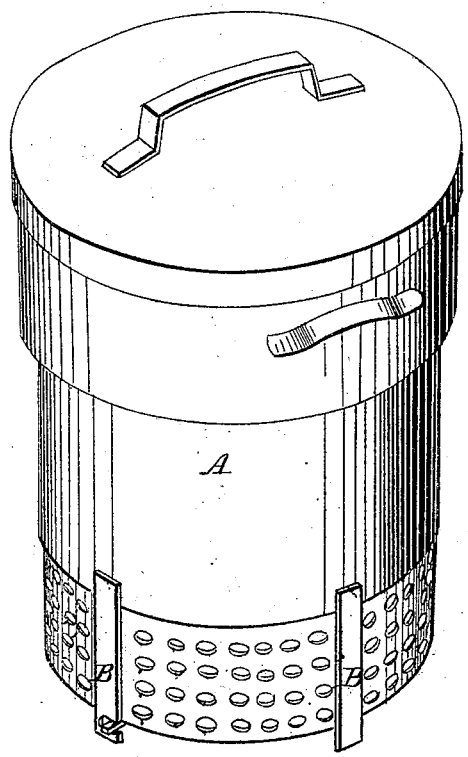
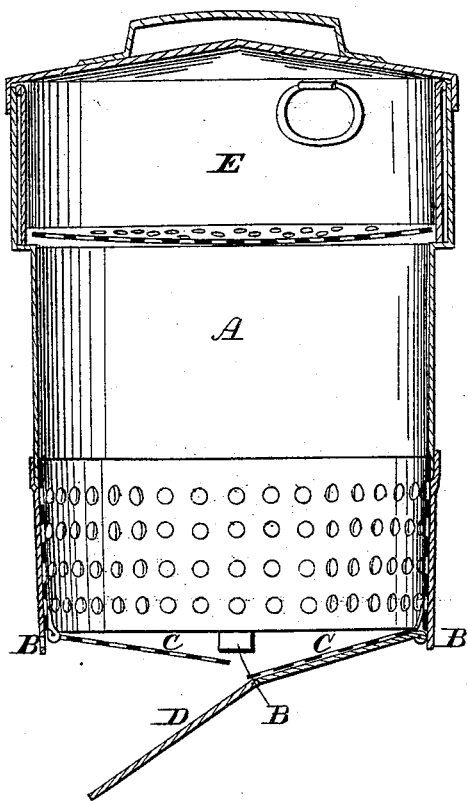
Witnesses.
Jno. S. Slater
Frank A. Jackson
Inventor
Otis M. Mitchell
By his Atty
Wm. C. Wood

United States Patent Office.

OTIS M. MITCHELL, OF MARATHON, NEW YORK.

Letters Patent No. 92,867, dated July 20, 1869.

CULINARY VESSEL.

The Schedule referred to in these Letters Patent and making part of the same.

*To all whom it may concern:*

Be it known that I, OTIS M. MITCHELL, of Marathon, in the county of Cortland, and State of New York, have invented a certain new and useful Vessel for Culinary Purposes; and I do hereby declare the following specification, taken in connection with the drawings furnished, and forming a part of the same, to be a true, clear, and exact description thereof.

My invention relates to that class of culinary vessels used in boiling and steaming vegetable or other substances, and constitutes a holder, drainer, and steamer, forming, at the same time, a convenient means for removing the contents, when boiled, from the kettle to the dish, ready for use, without the intervention of fork, spoon, or other similar medium.

Reference being had to the drawings—

Figure 1 represents my improvement complete.

Figure 2, a vertical section of the same, on the line $x\ y$, fig. 1.

Similar letters refer to like parts of my invention.

A represents the vessel, the bottom and lower part of which are made of wire gauze, sheet-metal, or equivalent material. The upper portion of the same is of a greater circumference than the lower, forming a shoulder, to support a steamer, when desired, and a flange on the outer surface, to rest upon the rim of the kettle, for an obvious purpose.

The apparatus is supplied with cover, handles, or bail, in the ordinary manner.

B are legs, the principal object of which is to keep the vessel from direct contact with the surface of the stove, when, for the purpose of drying its contents, it is placed thereon.

C is the perforated bottom of the vessel, made movable, and to operate upon hinges, or in any suitable manner, and may be constructed as shown in the drawings, or otherwise.

D is a rod or spring-catch, designed to hold the bottom in position. For convenience, this rod may have a hinge-joint, when the bottom is in two parts, and be fastened to one section of the bottom, or to the side of the vessel, in any suitable manner.

E represents a steamer, of ordinary form, fitting into the top of A, and retained in place by the shoulder hereinbefore referred to.

The operation of my invention is too obvious to require further explanation.

Having thus described my improvement,

What I claim as new, and of my own invention, and desire to secure by Letters Patent, is—

1. The improved culinary vessel herein described, provided with a perforated hinged bottom, C, and the bar or catch D, arranged and operating substantially as shown and specified, for the purposes set forth.

2. In combination with the culinary vessel herein described, provided with a perforated hinged bottom, C, and the bar or catch D, the steamer E arranged and operating substantially as shown and described, for the purposes specified.

OTIS M. MITCHELL.

Witnesses:
JNO. S. SLATER,
FRANK A. JACKSON.